United States Patent [19]

Corsi et al.

[11] Patent Number: 4,942,271

[45] Date of Patent: Jul. 17, 1990

[54] HINGED PLASTIC DUCT FOR CONDUIT

[75] Inventors: Paul J. Corsi, Terryville; Lawrence W. Engdahl, Guilford, both of Conn.; Daniel E. Klas, North Kingstown, R.I.

[73] Assignee: Hubbell Incorporated, Orange, Conn.

[21] Appl. No.: 280,960

[22] Filed: Dec. 7, 1988

[51] Int. Cl.⁵ .......................... H02G 3/04; E05D 7/10
[52] U.S. Cl. .................................... 174/101; 16/267; 16/374; 138/92; 138/162; 220/338; 403/117
[58] Field of Search .................. 174/68.3, 70 C, 72 C, 174/97, 101; 16/223, 260, 267, 355, 356, 374, 376, 377, 386, DIG. 29; 52/287, 288; 220/337, 338, 340; 138/92, 157, 162; 403/113, 116, 117; 439/209, 216

[56] References Cited

U.S. PATENT DOCUMENTS

| | | | |
|---|---|---|---|
| 2,263,946 | 11/1941 | Fletcher | 16/267 |
| 2,302,661 | 11/1942 | Benson | 16/355 X |
| 3,425,587 | 2/1969 | Duross, Jr. | 220/337 X |
| 3,727,644 | 4/1973 | Kagan | 138/157 X |
| 3,927,698 | 12/1975 | Johannsen | 138/162 |
| 4,423,284 | 12/1983 | Kaplan | 174/101 |
| 4,560,320 | 12/1985 | Baus | 138/162 X |
| 4,627,469 | 12/1986 | Buard | 138/92 |
| 4,640,314 | 2/1987 | Mock | 138/162 |
| 4,720,768 | 1/1988 | Schindele | 174/101 X |

FOREIGN PATENT DOCUMENTS

| | | | |
|---|---|---|---|
| 582361 | 9/1959 | Canada | 16/377 |
| 3335884 | 4/1985 | Fed. Rep. of Germany | 174/101 |
| 2425518 | 12/1979 | France | 52/287 |
| 609177 | 2/1979 | Switzerland | 174/68.3 |

Primary Examiner—Laramie E. Askin
Attorney, Agent, or Firm—Jerry M. Presson; Alfred N. Goodman; David L. Tarnoff

[57] ABSTRACT

A duct assembly for enclosing conduits, cables, wires, lines and the like, comprising a base having a generally U-shaped cross section along its longitudinal axis, and a cover having a generally U-shaped cross section along its longitudinal axis. The base includes a generally planar central portion with first and second legs extending substantially perpendicular thereto. The cover includes an intermediate portion having third and fourth legs extending substantially perpendicular thereto. The cover is pivotally and releasably coupled to the base at one end and releasably coupled to the base at the other end. The pivotal and releasable coupling is made up and released via a snap fit resulting from forces exerted substantially perpendicular to the longitudinal axes of the cover and the base. The pivotal coupling allows angular movement of the cover relative to the base through about 45° to about 60°.

19 Claims, 4 Drawing Sheets

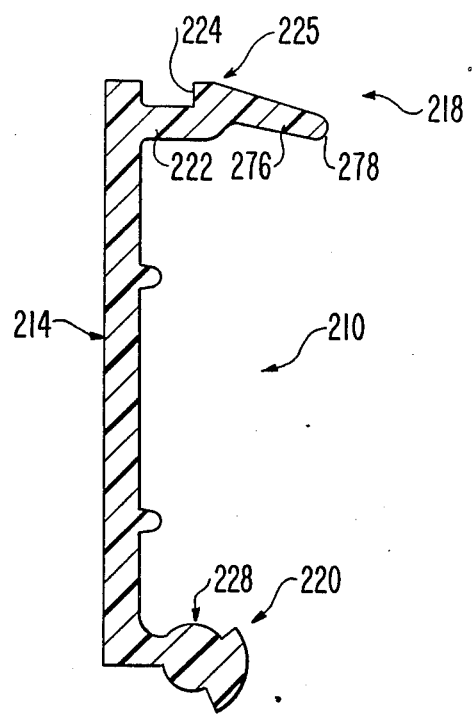
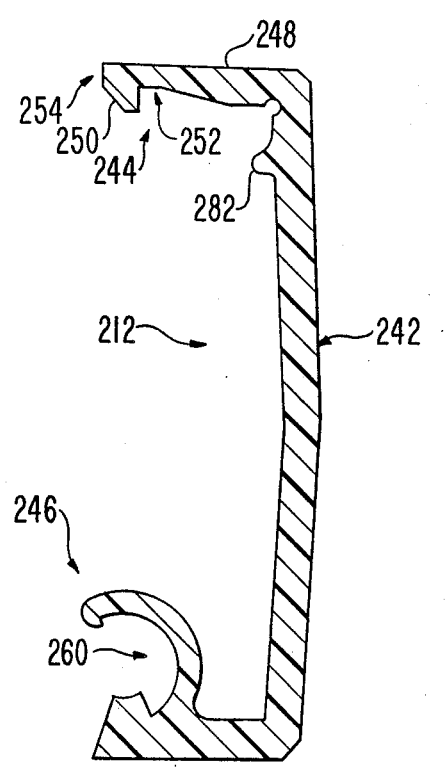
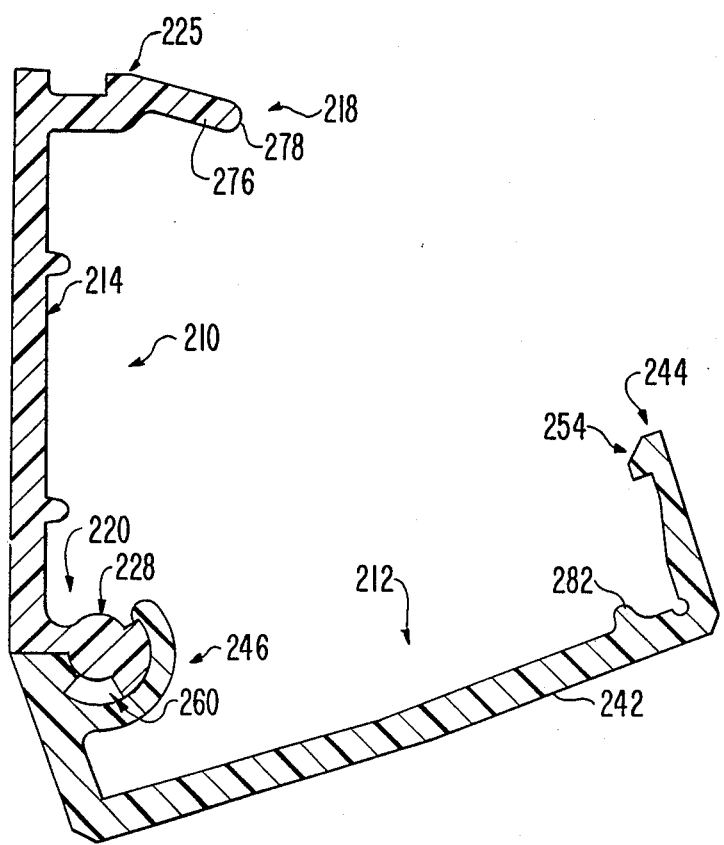
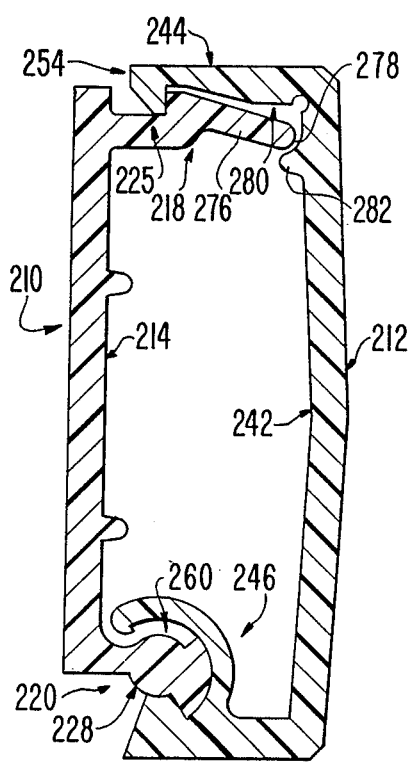

HINGED PLASTIC DUCT FOR CONDUIT

FIELD OF THE INVENTION

The invention relates to a duct assembly for enclosing conduits, cables, wires, lines, and the like. More specifically, the invention relates to a duct assembly including a base having a cover pivotally and releasably coupled thereto at one end and releasably coupled thereto at the other end. The pivotal and releasable coupling is made up and released via a snap fit. The relative pivotal movement between the cover and base is limited to about 45° to about 60°.

BACKGROUND OF THE INVENTION

Numerous duct assemblies are known in the prior art for mounting conduits therein. There are, however, several disadvantages to many of the prior art assemblies. For example, most of the prior art duct assemblies that have a removable cover require the conduits to be placed in the base of the duct assembly before the cover is attached. This makes installation difficult, since the conduits have a tendency to fall out of the base before the cover is attached. In addition, some of the prior art duct assemblies have hinged covers which require numerous parts, and thus are costly to manufacture. Moreover, the hinged covers of the prior art duct assemblies are difficult to attach to the base and typically have unrestricted pivotal movement through 180°.

Examples of these prior art devices are disclosed in U.S. Pat. Nos. 3,727,644 to Kagan; 3,927,698 to Johannsen; 4,627,469 to Buard; 4,640,314 to Mock; and 4,720,768 to Schindele.

SUMMARY OF THE INVENTION

Accordingly, a primary object of the invention is to provide a duct assembly that can readily receive and maintain conduits therein.

Another object of the invention is to provide a duct assembly with a pivotal cover which can easily be coupled to the base of the duct assembly via a snap fit and is limited in its pivotal movement.

Another object of the invention is to provide a duct assembly which can be easily manufactured at a relatively low cost.

The foregoing objects are basically attained by providing a duct assembly for enclosing conduits therein, the combination comprising: a base having a generally U-shaped cross section along its longitudinal axis, including a generally planar central portion having first and second legs extending substantially perpendicular thereto; a cover having a generally U-shaped cross section along its longitudinal axis, including an intermediate portion having third and fourth legs extending substantially perpendicular thereto; coupling members, coupled to the first and third legs, for releasably coupling the first and third legs together; and coupling members, coupled to the second and fourth legs, for pivotally coupling the second and fourth legs together through a maximum angular movement of about 60°, the coupling members for pivotally coupling including a mechanism for releasably coupling the second and fourth legs including an elongated rib, an elongated groove having an elongated opening being defined at least partially by a resilient arm, the rib having a maximum transverse thickness greater than the height of the opening, and wherein the rib and the groove are coupled and released via application of forces in directions substantially perpendicular to the longitudinal axes of the base and the cover.

Other objects, advantages and salient features of the invention will become apparent from the following detailed description, which, taken in conjunction with the annexed drawings, discloses three preferred embodiments of the invention.

BRIEF DESCRIPTION OF THE DRAWINGS

Referring now to the drawings which form part of this original disclosure:

FIG. 10 is a transverse cross-sectional view of a third embodiment of the base of the duct assembly in accordance with the invention;

FIG. 11 is a transverse cross-sectional view of a third embodiment of the cover of the duct assembly in accordance with the present invention;

FIG. 12 is a transverse cross-sectional view of the third embodiment wherein the cover is snapped onto the base; and FIG. 13 is a transverse cross-sectional view of the third embodiment with the base and cover in their closed position.

DETAILED DESCRIPTION OF THE INVENTION

Figure 1:
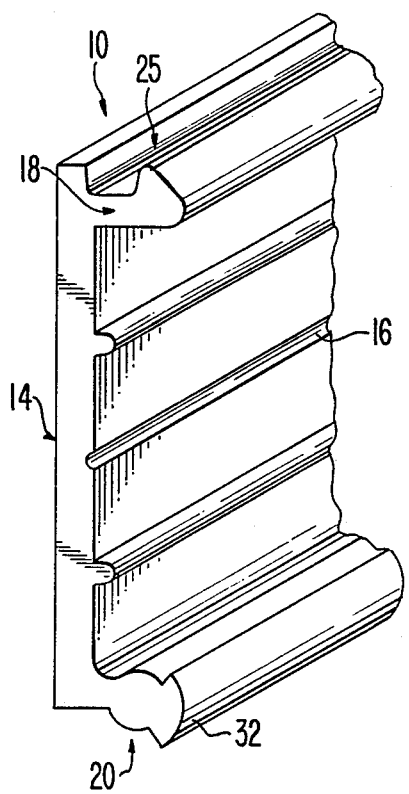
FIG. 1 is a fragmentary, right perspective end view of a first embodiment of the base of duct assembly in accordance with the present invention.
Figure 2:
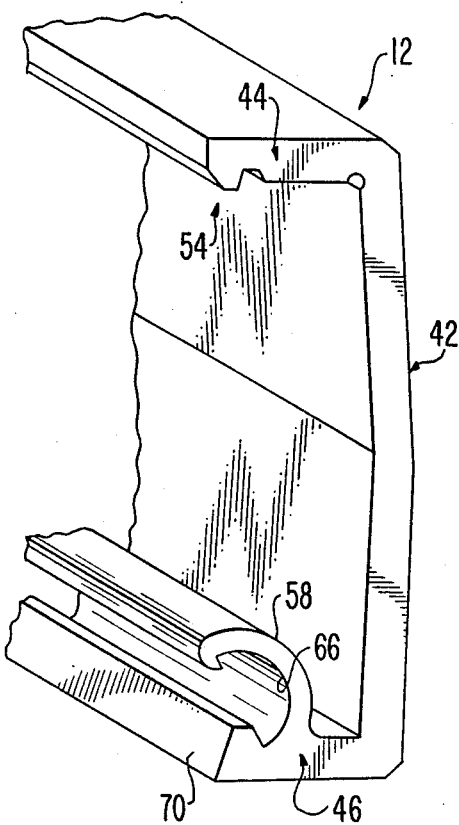
FIG. 2 is a fragmentary, left perspective end view of a first embodiment of the cover of the duct assembly in accordance with the present invention.

Referring now to FIGS. 1 and 2, the first embodiment of the duct assembly in accordance with the invention comprises a base 10 and a cover 12 which are adapted to be releasably and pivotally coupled together to enclose conduits therein. Both the base 10 and the cover 12 are preferably formed by extrusion of a somewhat resilient polymeric material.

The base 10 has a generally U-shaped cross section along its longitudinal axis. The base 10 includes a central portion 14 which is capable of being secured to a mounting wall (not shown) by using conventional fasteners, such as nails or screws. A locating recess 16 is provided in the central portion 14 for receiving the fasteners. The central portion 14 is generally planar having a first elongated leg 18 at one end extending substantially perpendicular thereto and a second elongated leg 20 at the other end extending substantially perpendicular thereto. The first leg 18 and the second leg 20 are integral with the central portion 14.

Figure 3:
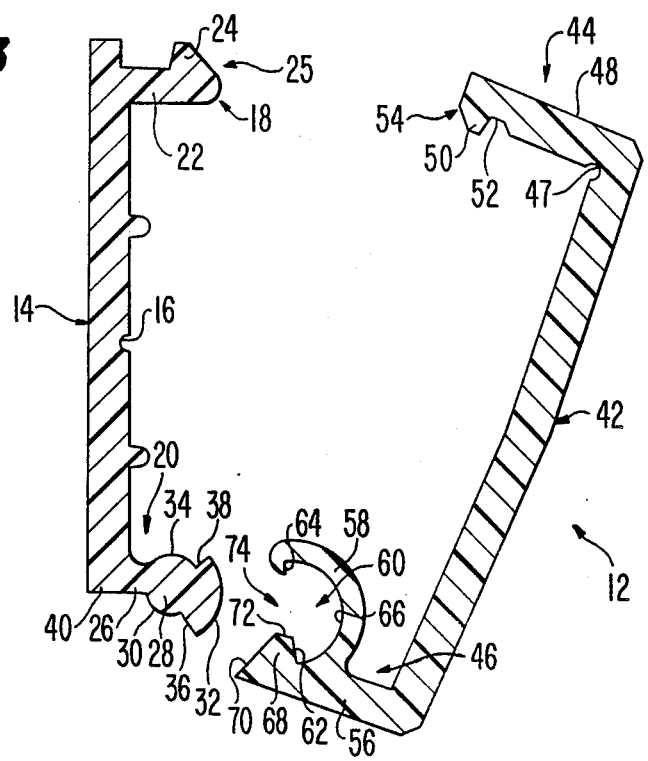
FIG. 3 is a transverse cross-sectional view of the first embodiment of the base and cover positioned just prior to assembly of the hinge.

As seen in FIG. 3, the first leg 18 includes a planar shank portion 22 and an outwardly extending flange 24 forming a hook 25. The second leg 20 includes a planar shank portion 26 having an elongated rib 28 extending outwardly therefrom. The rib 28 includes a first curvilinear surface 30, a second curvilinear surface 32, and a third curvilinear surface 34. The rib 28 further includes a first planar stop surface 36 extending radially outwardly from the rib 28 connecting the first curvilinear surface 30 and the second curvilinear surface 32, and a second planar stop surface 38 extending radially outwardly from the rib 28 connecting the second curvilinear surface 32 and the third curvilinear surface 34. The planar shank portion 26 of the second leg 20 includes an outwardly facing planar stop surface 40. The angle defined between stop surfaces 36 and 38 is about 105°.

The cover 12 has a generally U-shaped cross section along its longitudinal axis. The cover 12 includes an intermediate portion 42 having a third elongated leg 44 extending substantially perpendicular thereto at one end, and a fourth elongated leg 46 extending substantially perpendicular thereto at the other end. The third leg 44 and fourth leg 46 are integral with the intermediate portion 42. The third leg 44 is integrally coupled to the intermediate portion 42 by a reduced portion or curvilinear recess 47 to permit the third leg 44 to flex inwardly and outwardly. The third leg 44 includes a planar portion 48 having an inwardly extending flange 50 and a recess 52 adjacent thereto. The flange 50 and recess 52 form an inwardly facing hook 54. The inwardly facing hook 54 is adapted to engage the outwardly extending hook 25 of the first leg 18 on the base 10 via a snap fit.

As seen in FIGS. 1-3, the fourth leg 46 includes a planar portion 56 having a curved resilient arm 58 extending therefrom and an inwardly extending flange 68 forming an elongated groove 60 which is adapted to receive the rib 28. The flange 68 includes a first complementary planar stop surface 62 adjacent to the arm 58 and facing inwardly towards the groove 60. The arm 58 is coupled at one end to the planar portion 56 adjacent to the first planar stop surface 62 and includes a second complementary planar stop surface 64 at the free end, and an inner curvilinear surface 66 extending through about 180° between the first complementary planar stop surface 62 and the second complementary planar stop surface 64. The flange 68 forms the first planar stop surface 62 on one side and an outer stop surface 70 on its other side with a curvilinear surface 72 extending therebetween and including about 51°. Thus, the groove 60 and rib 28 have complementary configurations for permitting pivotal movement therebetween. The flange 68 and the free end of the resilient arm 58 form an elongated opening 74 for receiving the elongated rib 28 therethrough. The elongated opening 74 has a height between the inner ends of surface 64 and surface 72 which is less than the maximum transverse thickness of the elongated rib 28 between the outer ends of surfaces 36 and 38.

Preferably, the radius of curvature of surface 32 on the rib and surface 66 in the groove are the same, and the radius of curvature of surface 30 on the rib and surface 72 on the fourth leg 46 are the same.

Figure 4:
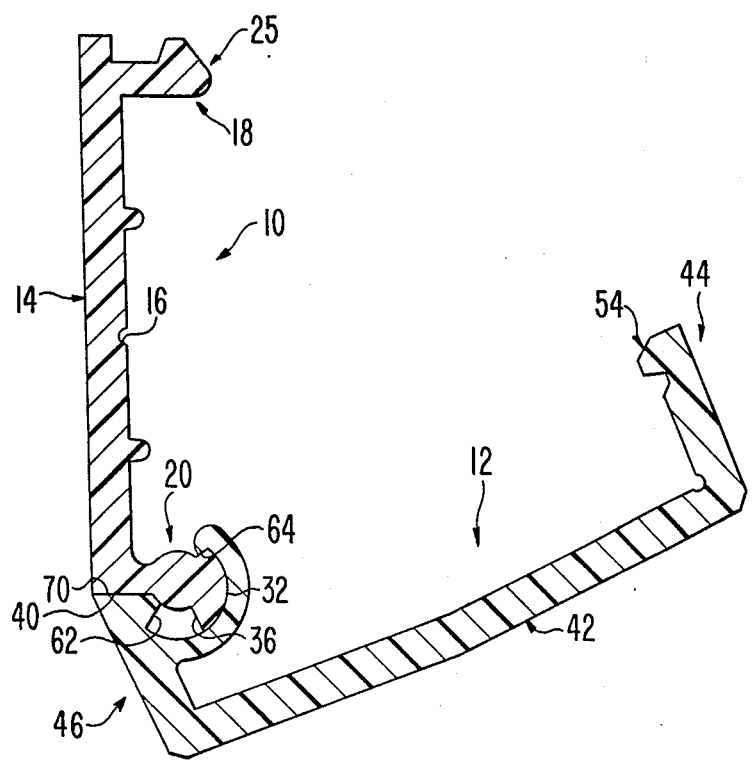
FIG. 4 is a transverse cross-sectional view of the first embodiment of the base and cover with the cover snapped onto the base.
Figure 5:
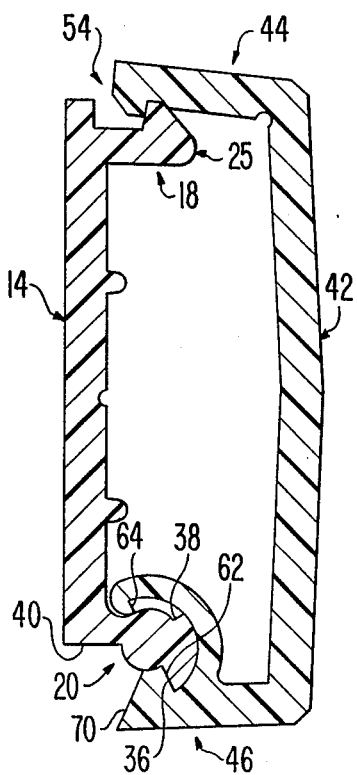
FIG. 5 is transverse cross-sectional view of the first embodiment of the base and the cover their closed position.
Figure 6:
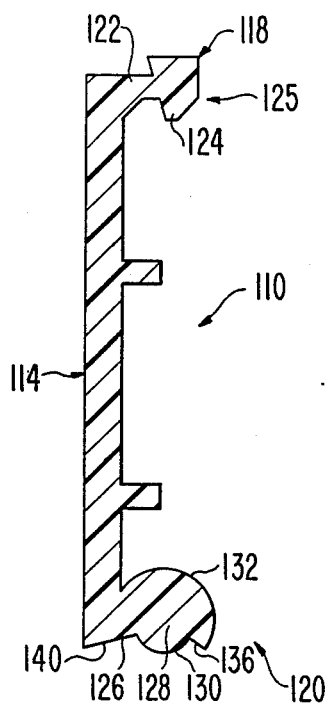
FIG. 6 is a transverse cross-sectional view of a second embodiment of the base of the duct assembly in accordance with the present invention.
Figure 7:
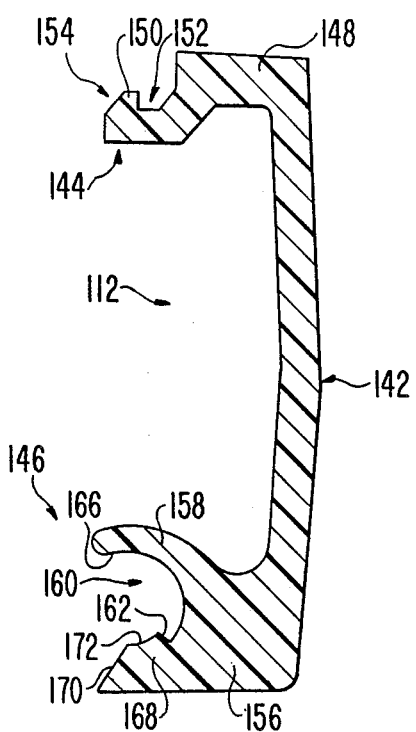
FIG. 7 is a transverse cross-sectional view of a second embodiment of the cover of the duct assembly in accordance with the present invention.

As is evident from FIGS. 3-5, the cover 12 can be transversely snap-fitted to the base 14 by application of a force in a direction substantially perpendicular to the longitudinal axes of the base and the cover and the rib 28 and groove 60. This snap, or friction, fit results from forcing the resilient arm 58 over the rib 28 and allowing the arm to be biased outwardly under the influence of the widest thickness of rib 28 between stop surfaces 36 and 38 and then snapped inwardly due to its own resilience once surfaces 62 and 64 are past surfaces 36 and 38. The making up and releasing of the snap fit coupling preferably takes place when the base and cover are oriented at about 20° as seen in FIG. 3. This pivotally couples the elongated rib 28 in the elongated groove 60 and the rib 28 is retained in groove 60 by the various opposed stop surfaces. The coupling can be transversely released via exertion of a force tending to pull the rib 28 from the groove 60 which is substantially perpendicular to the longitudinal axes of the rib and groove when the cover and base are oriented as seen in FIG. 3.

The second stop surface 38 of the rib 28 can abut the second stop surface 64 of the cover to limit the outward angular movement of the cover 12 as shown in FIG. 4 to about 60°. The first stop surface 36 of the rib 28 abuts the first stop surface 62 of the groove 60 to limit the inward angular movement of the cover 12 as shown in FIG. 5 when first leg 18 and third leg 44 are snapped together. The first curvilinear surface 30 of rib 28 slidably engages and coacts with the curvilinear surface 72 of flange 68, while the second curvilinear surface 32 of rib 28 slidably engages and coacts with the inner curvilinear surface 66 of the resilient arm 58 to provide smooth pivotal movement between the base 10 and the cover 12. As seen in FIGS. 4 and 5, the second curvilinear surface 32 is smaller than the inner curvilinear surface 66 to allow the pivotal movement of the cover relative to the base through about 60° from a position in which the cover and base are essentially at a zero angle, i.e., they are parallel, as seen in FIG. 5.

EMBODIMENT OF FIGS. 6-9

Referring now to FIGS. 6-9, a second embodiment of the duct assembly in accordance with the present invention is shown. The duct assembly of the second embodiment includes a base 110 and a cover 112 which are adapted to be releasably and pivotally coupled together. The base 110 includes a central portion 114 having at opposite ends a first leg 118 extending substantially perpendicular thereto and a second leg 120 extending substantially perpendicular thereto. The first leg 118 includes a planar shank portion 122 having an inwardly extending flange 124 forming a hook 125 at its free end. The second leg 120 includes a planar shank portion 126 having an elongated rib 128 at its free end. The rib 128 includes a first curvilinear surface 130 having an arc of about 135° and a second curvilinear surface 132 having an arc of about 180° and a planar stop surface 136 extending radially outwardly from the rib 128 connecting the first curvilinear surface 130 to the second curvilinear surface 132. The shank 126 of the second leg 120 includes an outer radial stop surface 140.

The cover 112 includes an intermediate portion 142 having at opposite ends third leg 144 extending substantially perpendicular thereto and a fourth leg 146 extending substantially perpendicular thereto. The third leg 144 includes a planar portion 148 having an outwardly extending hook 154 coupled to its free end for snap-fitting to hook 125 on the first leg 118. The outwardly extending hook 154 is formed by an outwardly extending flange 150 and an inwardly extending recess 152.

The fourth leg 146 includes a planar portion 156 including a resilient curved arm 158 and a flange 168 extending therefrom. The arm 158 and the flange 168 form a groove 160 therebetween. The flange 168 has a curvilinear surface 172 including an arc of about 90° facing inwardly towards the arm 158. The arm 158 has an inner curvilinear surface 166 With an angular extent of about 170° and with complementary planar stop surface 162 extending radially between the curvilinear surface 172 and the inner curvilinear surface 166. The transverse thickness of rib 128 between surfaces 130 and 132 is greater than the height of the opening of groove 160.

Figure 8:
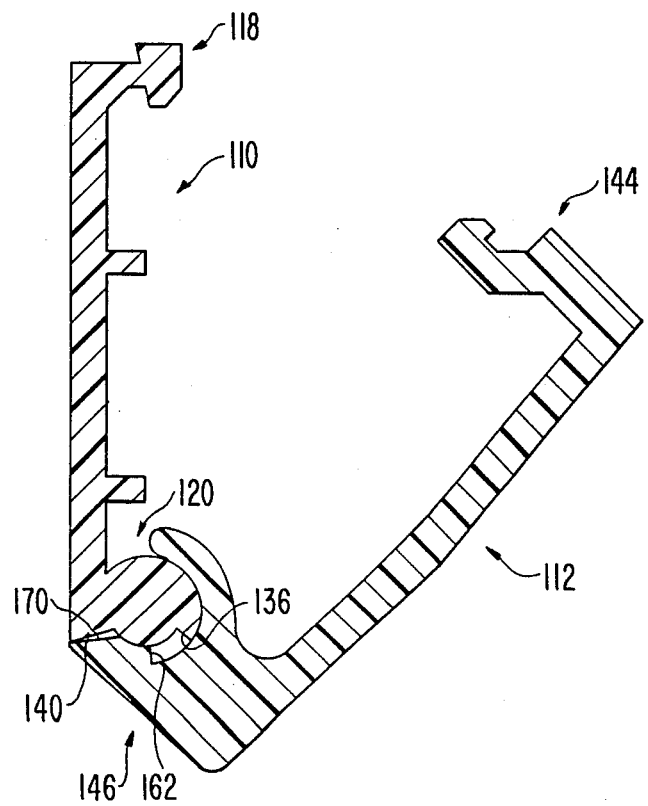
FIG. 8 is a transverse cross-sectional view of the second embodiment wherein the cover is snapped onto the base.
Figure 9:
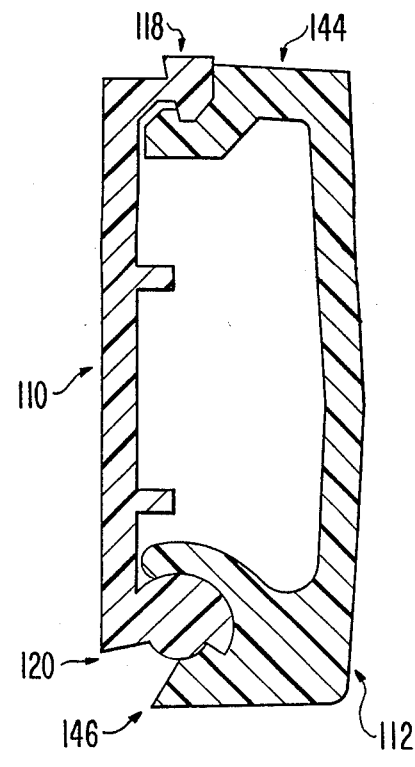
FIG. 9 is a transverse cross-sectional view of the second embodiment with the base and cover in their closed position.

As seen in FIGS. 8 and 9, the cover 112 is snap-fitted to the base 110 by application of a force in a direction substantially perpendicular to the longitudinal axes of the base and cover and the rib and groove, thereby pivotally but releasably coupling the elongated rib 128 in the elongated groove 160. In the closed position shown in FIG. 9, legs 118 and 144 are snap-fitted together to retain conduit within the duct assembly. This snap fit can be released by pushing down on leg 144.

The outward angular movement of the cover 112 relative to the base 110 is limited to about 45° by the abutment of the outer stop surface 140 of the shank portion 126 with the outer stop surface 170 of the fourth leg. 146. The inward movement of the cover 112 is limited by the planar stop surface 136 of the rib engaging with the planar stop surface 162 of the fourth leg. The snap fit of the cover and base is made up and released in a manner similar to that described above regarding the embodiment of FIGS. 1–5 with curved arm 158 being biased outwardly on making up and releasing the coupling. The cover 112 and base 110 are preferably oriented at an angle of about 20° to about 30° during the snap fit coupling and releasing.

EMBODIMENT OF FIGS. 10–13

Referring now to FIGS. 10–13, a third embodiment of the duct assembly in accordance with the present invention is shown. The duct assembly of the third embodiment includes a base 210 and a cover 212 which are adapted to be releasably and pivotally coupled together. This embodiment is substantially identical to the first embodiment, as seen in FIGS. 1–5, except for the means for coupling the first leg 218 and the third leg 244 together. Thus, only the means for coupling the first leg 218 and the third leg 244 will be discussed in detail below.

The base 210 includes a central portion 214 having at opposite ends a first leg 218 extending substantially perpendicular thereto and a second leg 220 extending substantially perpendicular thereto. The first leg 218 includes a planar shank portion 222 having an outwardly extending flange 224 forming a hook 225. The outwardly extending flange 224 includes an inwardly sloping extension member 276 having a free end 278. The second leg 220 has an elongated rib 228 thereon which is substantially identical to rib 28 shown in FIGS. 1–5.

The cover 212 includes an intermediate portion 242 having at opposite ends third leg 244 extending substantially perpendicular thereto and a fourth leg 246 extending substantially perpendicular thereto. The third leg 244 includes a substantially planar portion 248 having an inwardly extending hook 254 coupled to its free end.

for snap-fitting to hook 225 on the first leg 218. The inwardly extending hook 254 is formed by an inwardly extending flange 250 and an inwardly extending recess 252. The fourth leg 246 has an elongated groove 260 thereon which is substantially identical to groove 60 shown in FIGS. 1–5 and which slidably and pivotally receives rib 228 therein as in FIGS. 1–5.

As seen in FIGS. 12 and 13, the cover 212 is snap-fitted to the base 210 by application of a force in a direction substantially perpendicular to the longitudinal axes of the base and cover and the rib and groove, thereby pivotally but releasably coupling the elongated rib 228 in the elongated groove 260. In the closed position shown in FIG. 13, legs 218 and 244 are snap-fitted together to retain conduit within the duct assembly via engagement of hooks 225 and 254. The extension member 276 on leg 218 serves as a ramp for the third leg 244 to facilitate the snapping action therebetween. The extension member 276 also facilitates unsnapping the snap fit by forming a pocket 280 in which a screwdriver may be inserted to pry the duct assembly open and increases the structural strength of the cover.

The cover 212, as seen in FIGS. 11–13, includes a longitudinal abutment 282 extending from the interior surface of the intermediate portion 242. The longitudinal abutment 282 is transversely spaced from the third leg 244 to accommodate the free end 278 of extension member 276. When a downward force is applied to the third leg 244, the extension member 276 will abu the longitudinal abutment 282 to prevent the duct assembly from uncoupling.

INSTALLATION

In installing the duct assembly of FIGS. 1–5, the base 10 is mounted to a wall by using screws or the like in the locating recess 16 of the base 10. Then, the cover 12 is snap-fitted to the base 10 by inserting the rib 28 into the groove 60 as shown in FIG. 3 and the cover is pivoted away from the base as shown in FIG. 4. Next, conduits (not shown) are placed in the open duct assembly and are supported between the cover and the base. Finally, the cover 12 is pivoted upwardly and towards the base so that the hook 25 engages with the hook 54 to enclose the conduits therein as seen in FIG. 5. The duct assemblies of FIGS. 6–9 and FIGS. 10–13 are assembled and used in a similar manner. Since the cover and base in FIGS. 1–5, FIGS. 6–9 and FIGS. 10–13 can be snap-fitted together, they can also be disassembled via release of the rib in the corresponding groove by means of a force, which is perpendicular to their longitudinal axes, tending to pull them apart. Before this is done, the upper snap fit of legs 18 and 44, or legs 118 and 144, or legs 218 and 244 is released.

While only three embodiments have been chosen to illustrate the invention, it will be understood by those skilled in the art that various changes and modifications can be made therein without departing from the scope of the invention as defined in the appended claims.

What is claimed is:

1. A duct assembly for enclosing conduits therein, the combination comprising:
    a base having a generally U-shaped cross section along its longitudinal axis, including a generally planar central portion having first and second legs extending substantially perpendicular thereto;
    a cover having a generally U-shaped cross section along its longitudinal axis, including an intermediate portion having third and fourth legs extending substantially perpendicular thereto;

means, coupled to said first and third legs, for releasably coupling said first and third legs together; and means, coupled to said second and fourth legs, for pivotally coupling said second and fourth legs together through a maximum angular movement of about 60°.

said means for pivotally coupling including means for releasably coupling said second and fourth legs, which are coupled and released via application of forces in directions substantially perpendicular to the longitudinal axes of said base and said cover, said means for releasably coupling said second and fourth legs comprising an elongated rib having a maximum transverse thickness, and an elongated groove having an elongated opening at least partially defined by a resilient arm, said maximum transverse thickness of said rib being greater than the height of said elongated opening for providing a snap fit between said rib and said groove, said means for pivotally coupling further comprising said elongated rib having at least two curvilinear surfaces with a radially extending planar surface therebetween, said elongated groove having a pair of complementary curvilinear surfaces with a complementary radially extending planar surface extending therebetween, and said two curvilinear surfaces and said two complementary curvilinear surfaces coacting to allow pivotal movement between said base and said cover, and said planar surface being engageable with said complementary planar surface to limit the relative inward pivotal movement of said cover relative to said base.

2. The duct assembly according to claim 1, wherein said means for releasably coupling said first and third legs comprises an outwardly extending hook and an inwardly extending hook.

3. The duct assembly according to claim 1, wherein said base includes a recess therein for receiving means for mounting said base to a wall.

4. The duct assembly according to claim 1, wherein said central portion is integral with said first and second legs.

5. The duct assembly according to claim 1, wherein said intermediate portion is integral with said third and fourth legs.

6. The duct assembly according to claim 1, wherein said base and said cover are formed by extrusion.

7. The duct assembly according to claim 1, wherein said rib is coupled to said second leg and said groove is located on said fourth leg.

8. The duct assembly according to claim 1, wherein said means for pivotally coupling further comprises at least one generally planar stop surface on each of said second and fourth legs for limiting the relative outward pivotal movement between said base and said cover to about 60°.

9. The duct assembly according to claim 1, wherein said means for pivotally coupling further comprises at least one generally planar stop surface on each of said second and fourth legs for limiting the relative outward pivotal movement between said base and said cover to about 45°.

10. The duct assembly according to claim 1, wherein said rib further includes a third curvilinear surface and a second radially extending planar surface, and said groove further includes a second complementary radially extending planar surface engageable with said second planar surface of said rib to limit the relative outward pivotal movement. of said cover relative to said base.

11. The duct assembly according to claim 1, wherein said first leg includes an extension member at its free end for slidable engagement with said third leg to facilitate coupling and uncoupling of said first and third legs.

12. The duct assembly according to claim 11, wherein said cover member includes an abutment extending from said intermediate portion to abut against said extension member when a downward force is applied to said third leg.

13. A duct assembly for enclosing conduits therein, the combination comprising:

a base having a generally U-shaped cross section along its longitudinal axis, including a generally planar central portion having first and second legs extending substantially perpendicular thereto, said base being formed of a polymeric material;

a cover having a generally U-shaped cross section along its longitudinal axis, including an intermediate portion having third and fourth legs extending substantially perpendicular thereto, said cover being formed of a polymeric material;

means, coupled to said first and third legs, for releasably coupling said first and third legs together; and means, coupled to said second and fourth legs, for pivotally coupling said second and fourth legs together through a maximum angular movement of about 60°, said means for pivotally coupling including means for releasably coupling said second and fourth legs including an elongated rib, an elongated groove having an elongated opening being defined at least partially by a resilient arm, said rib having a maximum transverse thickness greater than the height of said opening, wherein said rib and said groove are coupled and released via application of forces in directions substantially perpendicular to the longitudinal axes of said base and said cover for providing a snap fit between said rib and said groove, said rib including an outer surface having at least two curvilinear surfaces with a radially extending planar surface therebetween, said groove having a pair of complementary curvilinear surfaces with a complementary radially extending planar surface extending therebetween, and said curvilinear surfaces and said complementary curvilinear surfaces coacting to allow pivotal movement between said base and said cover, and said planar surface being engageable with said complementary planar surface to limit the relative inward pivotal movement of said cover relative to said base.

14. The duct assembly according to claim 13, wherein said means for releasably coupling said first and third legs comprises an outwardly extending hook and an inwardly extending hook adapted to releasably couple said first and third legs together.

15. The duct assembly according to claim 13, wherein said means for pivotally coupling further comprises at least one generally planar stop surface on each of said second and fourth legs for limiting the relative outward pivotal movement between said base and said cover to about 45° to about 60°.

16. The duct assembly according to claim 13, wherein said outer surface of said rib further includes a third curvilinear surface and a second radially extending planar surface and said groove further includes a second complementary radially extending planar surface engageable with said second planar surface of said rib to limit the outward pivotal movement of said cover relative to said base.

17. The duct assembly according to claim 13, wherein said base and said cover are formed by extrusion.

18. The duct assembly according to claim 13, wherein said first leg includes an extension member at its free end for slidable engagement with said third leg to facilitate coupling and uncoupling of said first and third legs.

19. The duct assembly according to claim 18, wherein said cover member includes an abutment extending from said intermediate portion to abut against said extension member when a downward force is applied to said third leg.

* * * * *